United States Patent
Schwaiger et al.

(10) Patent No.: US 12,515,693 B2
(45) Date of Patent: Jan. 6, 2026

(54) METHOD FOR PLANNING A ROUTE FOR AN AUTOMATED GUIDED VEHICLE

(71) Applicant: Jungheinrich Aktiengesellschaft, Hamburg (DE)

(72) Inventors: Martin Schwaiger, Farchant (DE); Christian Mischitz, Graz (AT); Sascha Holesch, Töging (DE); Kandarp Gandhi, Freising (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 328 days.

(21) Appl. No.: 17/993,294

(22) Filed: Nov. 23, 2022

(65) Prior Publication Data
US 2023/0159049 A1 May 25, 2023

(30) Foreign Application Priority Data
Nov. 25, 2021 (DE) .................. 10 2021 130 984.0

(51) Int. Cl.
*B60W 60/00* (2020.01)
*B60W 30/182* (2020.01)
*B60W 40/02* (2006.01)

(52) U.S. Cl.
CPC ........ *B60W 60/001* (2020.02); *B60W 30/182* (2013.01); *B60W 40/02* (2013.01)

(58) Field of Classification Search
CPC ... B60W 60/001; B60W 30/182; B60W 40/02
(Continued)

(56) References Cited

U.S. PATENT DOCUMENTS 5,548,516 A * 8/1996 Gudat .................. G05D 1/0272
701/518
5,610,815 A * 3/1997 Gudat ..................... G01S 19/46
73/178 R
(Continued)

FOREIGN PATENT DOCUMENTS

CN  107219853 A  9/2017
DE  19983398 T1  6/2001
(Continued)

OTHER PUBLICATIONS

German Application No. 102021130984.0, Search Report mailed Oct. 12, 2022, 9 pages.
(Continued)

*Primary Examiner* — Luis A Martinez Borrero
(74) *Attorney, Agent, or Firm* — Kilpatrick Townsend & Stockton LLP

(57) ABSTRACT

A method for planning a route for an automated guided vehicle which can be operated in two different operating modes including a first operating mode in which the vehicle follows a firmly predetermined trajectory; and a second operating mode in which the vehicle follows a dynamically generated path located within a predetermined range of movement. The method includes subdividing an environment passable by the vehicle into first regions in which the vehicle is to be operated in the first operating mode and second regions in which the vehicle is to be operated in the second operating mode. The method includes defining, for each of the first regions, a corresponding trajectory to be traveled by the vehicle and defining, for each of the second regions, a corresponding predetermined range of movement.

18 Claims, 1 Drawing Sheet

Figure 1:
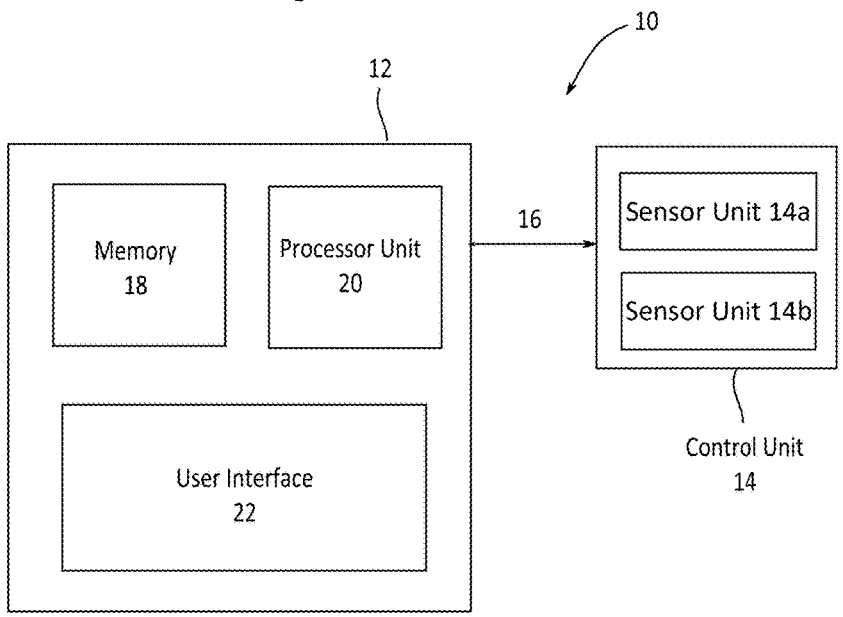

(58) Field of Classification Search
USPC .......................................................... 701/23
See application file for complete search history.

(56) References Cited

U.S. PATENT DOCUMENTS

| | | | | |
|---|---|---|---|---|
| 5,615,116 | A * | 3/1997 | Gudat .................... | B60K 31/04 318/587 |
| 10,108,193 | B2 * | 10/2018 | Wernersbach ....... | G05D 1/0272 |
| 10,795,368 | B2 * | 10/2020 | Wernersbach ........... | B66F 9/00 |
| 10,809,727 | B1 * | 10/2020 | Eckman ............... | G05D 1/0287 |
| 11,479,411 | B2 * | 10/2022 | Eckman ............... | G01C 21/206 |
| 11,767,168 | B2 * | 9/2023 | Eckman ............. | G05B 13/0265 701/25 |
| 11,829,144 | B2 * | 11/2023 | Wernersbach ....... | G05D 1/0272 |
| 2014/0371973 | A1 * | 12/2014 | Pfaff ................... | G05D 1/0088 901/9 |
| 2015/0285644 | A1 * | 10/2015 | Pfaff ................... | G06Q 10/047 701/25 |
| 2017/0108869 | A1 * | 4/2017 | Rohde ................. | G05D 1/0088 |
| 2017/0344009 | A1 * | 11/2017 | Wernersbach ....... | G05D 1/0011 |
| 2018/0181123 | A1 * | 6/2018 | Bauer ................. | G05D 1/0212 |
| 2018/0203455 | A1 * | 7/2018 | Cronin ................ | G05D 1/0217 |
| 2018/0348767 | A1 * | 12/2018 | Jafari Tafti ............ | G08G 1/166 |
| 2019/0196487 | A1 * | 6/2019 | Akiyama ........ | B60W 30/18163 |
| 2020/0150686 | A1 * | 5/2020 | Wieschemann ...... | G05D 1/0291 |
| 2020/0209857 | A1 * | 7/2020 | Djuric ................ | B60W 60/0011 |
| 2020/0255026 | A1 * | 8/2020 | Katardjiev ....... | G08G 1/096741 |
| 2020/0262451 | A1 * | 8/2020 | Zaum .................. | G05D 1/0088 |
| 2020/0319648 | A1 * | 10/2020 | Eckman ............... | G01C 21/206 |
| 2020/0346628 | A1 * | 11/2020 | Whitfield, Jr. ............ | B60T 7/22 |
| 2020/0371522 | A1 * | 11/2020 | Wernersbach ........... | B66F 9/00 |
| 2021/0064032 | A1 * | 3/2021 | Goldman-Shenhar ...................... G06N 20/00 |
| 2021/0080967 | A1 * | 3/2021 | Pettinger ............. | G05D 1/0221 |
| 2021/0191402 | A1 * | 6/2021 | Zhu ..................... | B60R 16/0231 |
| 2021/0262819 | A1 * | 8/2021 | Yu ...................... | G01C 21/3602 |
| 2021/0269242 | A1 * | 9/2021 | Eckman ............... | B65G 1/1375 |
| 2021/0403024 | A1 * | 12/2021 | Shih .................... | G06Q 10/0833 |
| 2022/0000025 | A1 * | 1/2022 | Middelberg ....... | A01D 41/1274 |
| 2022/0153296 | A1 * | 5/2022 | Yu ........................ | B60W 40/105 |
| 2022/0163971 | A1 * | 5/2022 | Lott ..................... | G05D 1/0214 |
| 2022/0374018 | A1 * | 11/2022 | Zhang ................. | G05D 1/0217 |
| 2023/0011864 | A1 * | 1/2023 | Shmueli ............... | A01B 69/001 |
| 2023/0012941 | A1 * | 1/2023 | Eckman ................ | G06Q 10/08 |
| 2023/0373722 | A1 * | 11/2023 | Eckman ............... | G05D 1/0297 |
| 2024/0053754 | A1 * | 2/2024 | Miura .................. | G05D 1/2446 |
| 2024/0059492 | A1 * | 2/2024 | Miura ................... | G05D 1/646 |

FOREIGN PATENT DOCUMENTS

| | | |
|---|---|---|
| DE | 10322765 A1 | 1/2005 |
| WO | 2020156843 A1 | 8/2020 |

OTHER PUBLICATIONS

European Application No. 22208512.8, "Extended European Search Report", Apr. 24, 2023, 7 pages.

* cited by examiner

METHOD FOR PLANNING A ROUTE FOR AN AUTOMATED GUIDED VEHICLE

CROSS REFERENCE TO RELATED APPLICATION

This application claims priority to German Patent Application No. 10 2021 130 984.0, filed in Germany on Nov. 25, 2021, the entire contents of which are hereby incorporated herein by this reference.

The present invention relates to a method for planning a route for an automated guided vehicle which can be operated in two different operating modes, and to a method and a system for operating such an automated guided vehicle.

Automated guided vehicles are autonomously or partially autonomously operated vehicles that fulfill transport functions in logistics facilities and are often also referred to as AGVs. In order to be able to move, automated guided vehicles are equipped with corresponding drives and control devices which enable them to drive along certain routes or paths, for example to travel distances between two stations where loading or unloading of the corresponding vehicle can be carried out. Furthermore, such automated guided vehicles are generally equipped with sensors which, on the one hand, fulfill safety functions and, on the other hand, contribute to the orientation of the vehicles, for example laser scanners and/or time-of-flight (TOF) cameras.

The prior art has pursued essentially two different approaches for planning the aforementioned paths, namely, on the one hand, predetermining exactly planned routes within the aforementioned logistics facility that are to be strictly followed by the automated guided vehicles, while on the other hand a strategy of only predetermining regions is also known, for example in connection with nodes and edges on planning graphs, within which the vehicles can individually and dynamically plan a route, with, for example, a deviation from the corresponding nodes and/or edges being permissible within some tolerance for the industrial trucks, as a result of which the regions are defined in practice.

In many cases, the second variant is to be preferred from a practical point of view, since the vehicles in this case generally carry out orientation using their environment and continuously try to find an optimal or at least suitable path within a defined movement range, which can improve the flexibility and availability and thus the efficiency of the logistics facility compared to firmly planned routes. Here, for example, the current traffic volume and the individual maneuverability of the vehicle can be taken into account in order to generate an efficient and time-saving path; however, in such scenarios there may be also situations in which such a strategy has its disadvantages.

This may be the case, for example, when a travel path passable by an automated guided vehicle is so narrow that a deviation within even the smallest tolerance limits could cause safety systems of the vehicle to activate, for example because a wall or another stationary object would enter the protected field of a safety scanner of the vehicle, which would result in a vehicle fault status.

It is therefore the object of the present invention to provide an improved method for planning a route for an automated guided vehicle, with which the aforementioned problems of the methods known from the prior art are eliminated and an efficient but still safe movement of such a vehicle is possible at any time.

For this purpose, it is assumed that the corresponding automated guided vehicle can be operated in two different operating modes, namely a first operating mode in which the vehicle follows a firmly predetermined trajectory, and a second operating mode in which the vehicle follows a dynamically generated path which has to be located within a predetermined range of movement. The method comprises subdividing an environment passable by the vehicle into first regions in which the vehicle is to be operated in the first operating mode, as well as second regions in which the vehicle is to be operated in the second operating mode, defining for each of the first regions a corresponding trajectory to be traveled by the vehicle, and defining for each of the second regions a corresponding predetermined range of movement.

In this way, the space available for the movement of the vehicle can be subdivided in a suitable manner in such a way that regions are defined in which firmly predetermined trajectories are to be followed, for example in the sections already indicated above, in which only a very small space is available for moving the vehicle, or, for example, also in the region of an entry and/or exit from stations to be approached, while in other regions in which such limitations do not apply, a movement within the predetermined range of movement is allowed according to the second operating mode. In this way, the advantages of the two aforementioned operating modes can be combined in a manner that allows for the efficient and safe operation of a corresponding automated guided vehicle at any time.

Here, the term "dynamically generated path" is to be understood to mean that, based on a corresponding predetermined range of movement, such a path is created by a control unit based on predetermined criteria during the running time of the vehicle, for example based on the execution of optimization algorithms in respect of a predicted travel time or a distance to be traveled. It is furthermore understood that the terms "first and second regions" are not to be understood to mean that, in fact, a plurality of such regions must be present in the environment in each case; according to the invention it is rather also possible to provide only one first and/or one second region in the environment to be subdivided.

For each transition between a first region and a second region, the method can further comprise defining a transition point or transition region such that a continuous transition between the first operating mode and the second operating mode is possible. This relates, in particular, to the fact that the automated guided vehicle must be able to switch from the first operating mode to the second operating mode, and vice versa, with minimal time loss and without stopping or having to travel additional distances. To this end, for example, it may be required not only for the vehicle to approach a fixed transition point at which it switches from one operating mode to the other operating mode, but also for a predetermined spatial orientation or direction of travel of the vehicle to be required at this point in order to be able to transition directly to a firmly predetermined trajectory beginning at this transition point in the orientation necessary for this purpose. Furthermore, it may also be required for the vehicle to arrive at the transition point at a predetermined speed, for example with a predetermined fixed speed value or a speed which is below a predetermined maximum speed.

As already indicated above, the definition of the trajectories of the first regions or the definition of the predetermined ranges of movement of the second regions can be carried out using nodes and edges based on graph methods that are known per se. In particular, the predetermined ranges of movement in the second regions can be defined around edges and nodes by means of tolerance regions in that certain maximum distances from the edges and nodes are permitted. Of course, any other parameterizations of a possible range of movement would also be conceivable, for example the pure definition of passable areas and of starting and end points of the distance to be traveled.

The present invention further relates to a method for operating an automated guided vehicle, which, on the one hand, comprises carrying out the above-described method for planning a route in a central server, wherein data representing the environment passable by the vehicle are generated, and transmitting the data to the automated guided vehicle and operating the automated guided vehicle such that it follows the corresponding firmly predetermined trajectory in the first regions and that it dynamically generates a path in the second regions, which path it then follows.

The method for operating the automated guided vehicle can further comprise recording the vehicle's environment by means of at least one sensor unit during operation of the vehicle, the information recorded in this way being taken into account during dynamic path generation. In this way, the automated guided vehicle is enabled to react in real time to changes in its operating environment and to always generate an efficient path in a dynamic manner, which can be optimized for example in terms of minimizing an expected travel time or distance to be traveled.

Although such a recording of the environment of the vehicle cannot be used in the first regions with their predetermined trajectories such that the path to be traveled by the vehicle is adapted, the data of the at least one sensor unit can, however, be used even in these first regions for other purposes, for example for error detection or for detecting obstacles that would make it impossible to travel on the predetermined fixed trajectory and thus require intervention by a human operator. Furthermore, in this context it is also possible for example to implement the functionality that, when an obstacle is detected in a first region, the speed is automatically adjusted, if necessary until the vehicle is stopped completely, without leaving the predetermined trajectory.

According to a further aspect, the present invention relates to a system for operating an automated guided vehicle according to a method of this type, comprising a central server which is configured to enable the method for planning a route according to the invention to be carried out, and the corresponding automated guided vehicle, which is configured to receive the data generated by the central server and to be operated in both the first and the second operating mode.

Transmission of the data from the central server to the automated guided vehicle can take place, for example, via a wireless communication link, which would, for example, enable an adaptation of the data even during ongoing operation of the vehicle; or the corresponding data can be uploaded locally by means of a data carrier during the commissioning or maintenance of the vehicle.

As already indicated, the vehicle can be assigned at least one sensor unit for recording its environment, wherein the data recorded by this at least one sensor unit can be used in the manner described above for dynamically generating a path to be traveled in the second operating mode and overall for detecting obstacles and faults.

Figure 2:
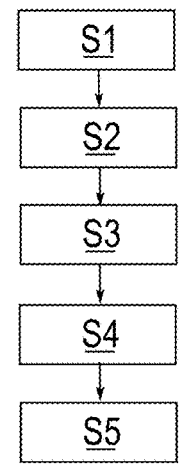
Figure 3:
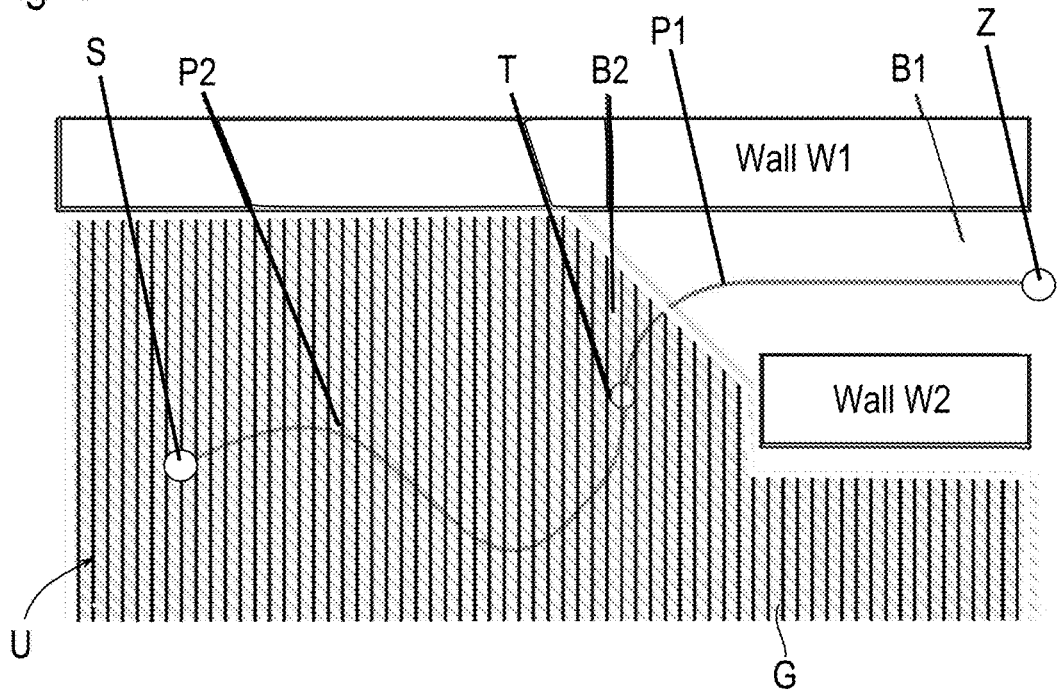

Further features and advantages of the present invention will become even more apparent from the following description of an embodiment, when this is considered together with the accompanying figures. They show in detail:

FIG. 1 a schematic diagram of a system according to the invention for operating an automated guided vehicle;

FIG. 2 a flowchart for illustrating a method for operating the automated guided vehicle from FIG. 1; and FIG. 3 a schematic diagram of an environment passable by the vehicle from FIG. 1.

FIG. 1 first shows, in a purely schematic manner, a system for operating an automated guided vehicle, which system is overall denoted by reference sign 10. The system comprises a central server 12 and the actual automated guided vehicle 14 having its own control unit 14a and at least one sensor unit 14b. The sensor unit 14b can be configured to monitor the environment of the vehicle 14 for compliance with safety requirements and/or for the orientation of the vehicle 14. The server 12 and the vehicle 14 are furthermore connected to one another in terms of a data connection, for example via a wireless communication channel denoted by reference sign 16.

Furthermore, the central server 12 is assigned a user interface 22 in addition to a memory 18 and a processor unit 20, which user interface can be formed, for example, of a touchscreen or a combination of a screen with a keyboard and/or further input devices. The user interface 22 enables a human user of the central server to carry out route planning for the automated guided vehicle 14 as part of the method shown in FIG. 2 and described further below, a possible representation for visualizing this route planning on the user interface 22 being shown in FIG. 3 and likewise described further below.

The data generated in this context with respect to the route planning performed can then be transmitted to the industrial truck 14 via the communication channel 16, which truck can then travel distances in the corresponding environment in accordance with the two operating modes while being controlled by the control unit 14a.

The method according to the invention for operating the automated guided vehicle is now to be explained with reference to the flowchart from FIG. 2, which method initially comprises a method for planning a route for the automated guided vehicle 14. For this purpose, a passable environment, for example a logistics facility, which represents the entire space where routes for the vehicle 14 are possible and which can contain, for example, approachable stations or other distance markers, is initially specified or created in step S1.

The passable environment is then subdivided into first regions and second regions in step S2, wherein the vehicle has to follow firmly predetermined trajectories in the first regions and should follow a dynamically generated path in the second regions, which path has to be located within a predetermined range of movement and thus offers increased flexibility in terms of optimizing a travel time, avoiding obstacles and the like.

Accordingly, corresponding fixed trajectories and predetermined ranges of movement can be defined in step S3, which can take place subsequently or simultaneously with step S2, wherein such planning can be carried out, for example, based on graphs with the aid of edges and nodes. Furthermore, transition points or transition regions where respective transitions between first and second regions and thus between the first and second operating mode of the automated guided vehicle 14 are to take place can be defined in step S3.

Based on the subdivision of the passable environment into first and second regions and the definition of the trajectories or predetermined ranges of movement to be traveled, the central server 12 now generates data that can be used for the industrial truck 14 in step S4, which data are transmitted, also in step S4, for example by means of wireless communication or via a corresponding data carrier to the vehicle 14 and are stored and held available by the latter for further use by the control unit 14a.

Subsequently, in step S5, the automated guided vehicle 14 is equipped with all the data necessary for regular operation, and it can be operated in the usual manner to carry out transport tasks within the passable environment, for which purpose it travels paths in its first and second operating modes in corresponding first and second regions of the defined environment. In particular in the second operating mode, such paths are generated dynamically during the running time of the vehicle 14 based on the data available and using the control unit 14a, wherein information about the environment of the vehicle 14 recorded by means of at least sensor unit 14b is also used.

Finally, it shall be explained with reference to FIG. 3 and the schematic diagram of an operating environment U of the industrial truck 14 shown therein, how path planning can be visualized in a specific example. In this case, two walls W1 and W2 are contained in the environment U, which represent insurmountable obstacles for the automated guided vehicle 14 and therefore define impassable regions, while, on the other hand, a passable ground is denoted by reference sign G in FIG. 3.

In the example illustrated in FIG. 3, the aim is to guide the industrial truck 14 from a starting point S to a destination Z, wherein this destination Z lies between the two walls W1 and W2, and the passable corridor leading to the destination Z is so narrow that dynamic path planning would lead to problems at this point.

Accordingly, in the method according to the invention, the passable ground G of the environment U is subdivided into a first region B1 and a region B2 shown as a hatched area in FIG. 3, wherein in the first region B1 the vehicle 14 has to follow the fixed trajectory P1, while in the second region B2 the vehicle 14 is initially permitted to move on the entire hatched area so that in the example shown, the second regions B2 is identical to a predetermined range of movement. In other examples, however, a predetermined range of movement could be present only on a portion of a second region, for example when nodes and edges of a graph are defined in said region and the corresponding range of movement has to be located within a predetermined tolerance thereof.

Furthermore, a transition point T has been defined here, where the actual transition between the second operating mode and the first operating mode of the vehicle 14 is to take place when the distance is traveled from the starting point S to the destination Z. Accordingly, when starting its journey at the starting point S, a path to the transition point T is initially generated dynamically by the vehicle 14 based on predetermined criteria and algorithms, which path is denoted by P2 in the example shown and could be in principle the entire region B2.

At the transition point T, the vehicle 14 now changes to the fixed trajectory P1 and follows it as precisely as possible, without deviation, until it reaches the destination Z, in order to be able to move forward in a trouble-free and secure manner and with sufficient distances in the narrow corridor between the two walls W1 and W2, while no warnings or faults are output by safety systems, such as the sensor unit 14b, for example.

When moving in the opposite direction from point Z to point S, an analogous journey can accordingly take place in the reverse manner, i.e., the trajectory P1 is first followed from point Z to the transition point T, and then a path P2 is generated dynamically in the second region B2, and said path is followed.

The invention claimed is:

1. A method for planning a route for an automated guided vehicle which can be operated in two different operating modes including:
   a first operating mode in which the vehicle follows a predetermined trajectory; and
   a second operating mode in which the vehicle follows a dynamically generated path located within a predetermined range of movement,
   the method comprising:
      receiving, via a user interface, user input including route planning data related to a passable environment of the automated guided vehicle;
      subdividing, based on the user input route planning data, the passable environment into first regions in which the vehicle is to be operated in the first operating mode and second regions in which the vehicle is to be operated in the second operating mode;
      defining, for each of the first regions, a corresponding predetermined trajectory to be traveled by the vehicle; and
      defining, for each of the second regions, a corresponding predetermined range of movement.

2. The method of claim 1, further comprising, for each transition between a first region and a second region, defining a transition point or a transition region such that a continuous transition between the first operating mode and the second operating mode is possible.

3. The method of claim 1, wherein one or more of a definition of the trajectories of the first regions or a definition of the predetermined ranges of movement of the second regions is carried out using nodes and edges.

4. The method of claim 3, wherein the predetermined ranges of movement are defined around the edges and the nodes based on tolerance ranges.

5. The method of claim 1, further comprising recording, during operation of the automated guided vehicle, the environment of the automated guided vehicle, wherein the dynamically generated path is generated based on the recorded information.

6. A method for operating an automated guided vehicle, comprising:
   in a central server:
      receiving, via a user interface, user input including route planning data related to a passable environment of the automated guided vehicle;
      subdividing, based on the user input route planning data, the passable environment into first regions in which the automated guided vehicle is to be operated in a first operating mode and second regions in which the automated guided vehicle is to be operated in a second operating mode;
      defining, for each of the first regions, a corresponding predetermined trajectory to be traveled by the automated guided vehicle;
      defining, for each of the second regions, a corresponding predetermined range of movement; and
      generating data representing the environment passable by the automated guided vehicle, wherein the generated data identifies the first regions and each corresponding predetermined trajectory and the second regions and each corresponding predetermined range of movement;

transmitting the generated data to the automated guided vehicle; and operating the automated guided vehicle such that the automated guided vehicle operates in the first operating mode in which it follows the corresponding predetermined trajectory in each of the first regions, and that it operates in the second operating mode in which it dynamically generates and follows a path in each of the second regions, wherein each dynamically generated path is located within the corresponding predetermined range of movement.

7. The method of claim 6, further comprising recording the environment of the vehicle using at least one sensor unit during operation of the automated guided vehicle, wherein each dynamically generated path is generated based on the recorded information of the sensor unit.

8. The method of claim 6, further comprising, for each transition between a first region and a second region, defining a transition point or a transition region such that a continuous transition between the first operating mode and the second operating mode is possible.

9. The method of claim 6, wherein one or more of a definition of the trajectories of the first regions or a definition of the predetermined ranges of movement of the second regions is carried out using nodes and edges.

10. The method of claim 9, wherein the predetermined ranges of movement are defined around the edges and the nodes based on tolerance ranges.

11. A system for operating an automated guided vehicle, comprising:
    an automated guided vehicle; and
    a central server configured plan a route by:
        receiving, via a user interface, user input including route planning data related a passable environment of the automated guided vehicle;
        subdividing, based on the user input route planning data, the passable environment into first regions in which the automated guided vehicle is to be operated in a first operating mode in which the automated guided vehicle follows a predetermined trajectory and second regions in which the automated guided vehicle is to be operated in a second operating mode in which the automated guided vehicle follows a dynamically generated path located within a predetermined range of movement;
        defining, for each of the first regions, a corresponding predetermined trajectory to be traveled by the automated guided vehicle;
        defining, for each of the second regions, a corresponding predetermined range of movement; and
        generating data representing the environment passable by the automated guided vehicle, wherein the generated data identifies the first regions and each corresponding predetermined trajectory and the second regions and each corresponding predetermined range of movement,
    wherein the automated guided vehicle is configured to receive the data representing the environment generated by the central server, and wherein the automated guided vehicle is configured to be operated in both the first operating mode and in the second operating mode.

12. The system of claim 11, further comprising a wireless communication link configured to transmit the data representing the environment from the central server to the automated guided vehicle.

13. The system of claim 11, wherein an adjustment of the data is enabled during ongoing operation of the automated guided vehicle.

14. The system of claim 11, wherein the automated guided vehicle is assigned at least one sensor unit for recording the environment.

15. The system of claim 11, wherein the central server is further configured to define, for each transition between a first region and a second region, a transition point or a transition region such that a continuous transition between the first operating mode and the second operating mode is possible.

16. The system of claim 11, wherein one or more of a definition of the trajectories of the first regions or a definition of the predetermined ranges of movement of the second regions is carried out using nodes and edges.

17. The system of claim 16, wherein the predetermined ranges of movement are defined around the edges and the nodes based on tolerance ranges.

18. The system of claim 11, further comprising at least one sensor unit, the at least one sensor unit configured to record, during operation of the vehicle, the environment of the vehicle, wherein a dynamically generated path is generated based on the recorded information.

* * * * *